(12) United States Patent
Young et al.

(10) Patent No.: US 11,118,372 B2
(45) Date of Patent: Sep. 14, 2021

(54) AUTO-LOCKING TELESCOPING MAST

(71) Applicants: Cameron Jay Young, Parma, OH (US); Rexford Richard Mast, Wooster, OH (US); Ng Kah Fei, Singapore (SG)

(72) Inventors: Cameron Jay Young, Parma, OH (US); Rexford Richard Mast, Wooster, OH (US); Ng Kah Fei, Singapore (SG)

(73) Assignee: The Will-Burt Company, Orrville, OH (US)

( * ) Notice: Subject to any disclaimer, the term of this patent is extended or adjusted under 35 U.S.C. 154(b) by 0 days.

(21) Appl. No.: 16/430,965

(22) Filed: Jun. 4, 2019

(65) Prior Publication Data

US 2019/0368216 A1 Dec. 5, 2019

Related U.S. Application Data

(60) Provisional application No. 62/680,776, filed on Jun. 5, 2018.

(51) Int. Cl.
*E04H 12/18* (2006.01)
*B66C 23/70* (2006.01)
*F16B 7/10* (2006.01)

(52) U.S. Cl.
CPC ......... *E04H 12/182* (2013.01); *B66C 23/708* (2013.01); *F16B 7/105* (2013.01)

(58) Field of Classification Search
CPC ..... E04H 12/182; F16B 7/105; B66C 23/708; B66C 23/701
See application file for complete search history.

(56) References Cited

U.S. PATENT DOCUMENTS

| | | | | |
|---|---|---|---|---|
| 2,708,493 A | * | 5/1955 | Badertscher | E04H 12/182 52/115 |
| 2,795,303 A | * | 6/1957 | Muehlhause | E04H 12/182 52/121 |
| 3,047,107 A | * | 7/1962 | Parmenter | E04H 12/182 52/121 |
| 3,688,455 A | * | 9/1972 | Zebuhr | H01Q 1/1235 52/115 |
| 5,628,416 A | * | 5/1997 | Frommelt | B66C 23/705 212/292 |
| 6,216,895 B1 | * | 4/2001 | Erdmann | B66C 23/708 212/292 |
| 9,090,438 B2 | * | 7/2015 | Krebs | B66C 23/708 |
| 9,637,358 B2 | * | 5/2017 | Knecht | B66C 23/42 |

(Continued)

FOREIGN PATENT DOCUMENTS

JP 62-180148 11/1987

*Primary Examiner* — Michael E Gallion
(74) *Attorney, Agent, or Firm* — Fay Sharpe LLP (57) ABSTRACT

An auto-lock assembly for a telescoping mast having a plurality of telescoping tube sections configurable between a retracted position and an extended position is disclosed herein. Also disclosed herein is a telescoping mast, which includes a plurality of telescoping mast sections including a base tube, an intermediate tube, and an end tube, the intermediate and end tube adapted to be telescopically received in the base tube, a base auto-lock having a collar for mounting to the base tube, and an intermediate auto-lock having a collar for mounting to the intermediate tube. Further disclosed herein is an auto-lock for use with a telescoping mast having a plurality of tube sections.

20 Claims, 5 Drawing Sheets

(56) References Cited

U.S. PATENT DOCUMENTS

| | | | | |
|---|---|---|---|---|
| 9,670,948 | B1* | 6/2017 | Wasson | B66C 23/00 |
| 10,479,658 | B2* | 11/2019 | Zhang | B66C 23/62 |
| 2001/0052506 | A1* | 12/2001 | Richter | B66C 23/705 |
| | | | | 212/177 |
| 2003/0057172 | A1* | 3/2003 | Harrington | B66C 23/708 |
| | | | | 212/292 |
| 2008/0236060 | A1* | 10/2008 | Battaglia | E04H 12/182 |
| | | | | 52/121 |
| 2010/0005734 | A1* | 1/2010 | McClure | E04H 12/182 |
| | | | | 52/111 |
| 2014/0158657 | A1* | 6/2014 | Knecht | B66C 23/36 |
| | | | | 212/299 |
| 2016/0301128 | A1* | 10/2016 | Blackwelder | E04H 12/182 |

* cited by examiner

AUTO-LOCKING TELESCOPING MAST

CROSS-REFERENCE TO RELATED APPLICATION

This application claims the benefit of U.S. Provisional Application No. 62/680,776, filed Jun. 5, 2018, incorporated herein by reference in its entirety.

BACKGROUND

The present exemplary embodiment relates to telescoping masts. It finds particular application in conjunction with auto-locking/unlocking telescoping masts and will be described with particular reference thereto. However, it is to be appreciated that the present exemplary embodiment is also amenable to other like applications.

Pneumatically actuated telescoping masts are known in the art, and are, for example, mounted on the roof of a motor vehicle such as an emergency vehicle or utility vehicle. Alternatively, mounting configurations may also involve the floor of a vehicle, allowing the telescoping mast to extend through the roof of the vehicle. The mast is generally used for positioning various devices at an elevated point above the vehicle. Pneumatically actuated telescoping masts are particularly advantageous for such uses, because they are lightweight, compact in the retracted position, and quickly transportable to a site by the vehicles on which they are mounted. Pneumatically actuated telescoping masts are extended and retracted using air under pressure and, in a fully extended use position, are usually vertical, although they can be inclined in the use position. The vehicle on which the telescoping mast is mounted typically includes a compressor and appropriate pneumatic controls for displacing the mast sections between retracted and extended positions.

In a typical mast, each telescoping section includes a hollow cylindrical body with a collar secured to an end thereof. The collar can include a keyway (or key) for rotationally interlocking the telescoping section with an adjacent telescoping section or sections. The collar can also provide reinforcement to the cylindrical body.

Many prior art masts utilize a collar at the top of each telescoping section that extends radially outwardly from the cylindrical body. Such collars are often bolted or otherwise secured to the cylindrical body of the telescoping section. This allows an adjacent (smaller diameter) cylindrical body of an adjacent connected telescoping section to be retracted into the larger diameter telescoping section. In this manner, each telescoping section can be retracted into the next larger telescoping section.

It will be appreciated, however, that as payload capacities and weight of pneumatic masts increase, standing near or around the mast during operation is becoming more of a safety concern. Concern for user safety is further heightened by the manual locking and unlocking of telescoping mast sections required by known pneumatic masts.

While the above-described mast assemblies have been commercially successful, there is a need for an improved telescoping mast which addresses the disadvantage described above.

BRIEF DESCRIPTION

In accordance with one aspect of the exemplary embodiment, an auto-lock assembly for a telescoping mast having a plurality of telescoping tube sections configurable between a retracted position and an extended position is provided. The assembly includes a first latch pin mounted perpendicularly to a first tube section, the first latch pin being preloaded toward a locked position with a second tube section and configured to move linearly to an unlocked position with respect to the second tube section. A first latch lever is mounted to the first latch pin, the first latch lever configured to pivot between a parallel position and a rotated position with respect to the first tube section. A guide plate is mounted parallel to a third tube section and an angled bearing surface disposed on an upper portion of the guide plate, the guide plate and angled bearing surface configured to contact the first latch lever. The first latch pin is preloaded to move linearly into the locked position with the second tube section when the second tube section is in the extended position with respect to the first tube section. Further, the first latch pin moves linearly from the locked position to the unlocked position by the pivoting movement of the first latch lever and the first latch lever pivots from the parallel position to the rotated position by the contact with the angled bearing surface of the guide plate when the first tube section is in the retracted position with respect to the third tube section to thereby allow the retracted position of the second tube section with respect to the first tube section.

In accordance with another aspect of the exemplary embodiment, a telescoping mast is provided. The telescoping mast includes a plurality of telescoping mast sections including a base tube, an intermediate tube, and an end tube, the intermediate and end tube adapted to be telescopically received in the base tube, a base auto-lock having a collar for mounting to the base tube, and an intermediate auto-lock having a collar for mounting to the intermediate tube. Both the base auto-lock and the intermediate auto-lock include a latch pin housed in the collar and configured to move linearly between a locked and unlocked position, a latch lever mounted to the latch pin and configured to pivot between a parallel position and a rotated position with respect to the plurality of telescoping mast sections, and a guide plate mounted on the collar and oriented parallel to the plurality of telescoping mast sections. The base auto-lock latch pin is movable into the locked position with the intermediate tube when the intermediate tube is fully extended out of the base tube. The intermediate auto-lock latch pin is movable into the locked position with the end tube when the end tube is fully extended out of the intermediate tube and is movable into the unlocked position with the end tube when the intermediate auto-lock latch lever pivots from the parallel position to the rotated position by contact with the base auto-lock guide plate when the intermediate tube is retracted into the base tube, thereby allowing the end tube to retract into the intermediate tube.

In accordance with yet another aspect of the exemplary embodiment, an auto-lock for use with a telescoping mast having a plurality of tube sections is provided. The auto-lock includes a plurality of collars, each collar mountable to an associated tube section, a plurality of spring-activated latch pins, each latch pin housed in an associated collar and oriented perpendicular to the plurality of tube sections, and configured to move linearly between a locked and an unlocked position with an associated tube section, a plurality of latch levers, each lever mounted on an associated latch pin and configured to pivot between a parallel position and a rotated position with respect to the plurality of tube sections and to move the associated latch pin into the unlocked position, and a plurality of guide plates, each guide plate mounted on an associated collar and oriented parallel to the plurality of tube sections, each guide plate configured to move an associated latch lever from the parallel position to the rotated position.

DETAILED DESCRIPTION

Described herein is a telescoping mast that extends when the internal pressure of the mast is increased relative to the outside atmospheric pressure. Each tube section of the telescoping mast reaches its maximum extended height when a latch panel (welded around the outside surface of said tube section) contacts a collar fastened to the next larger adjacent tube section. Once this happens, latch or locking pins (pre-loaded via springs) on the collar assembly engage into a cutout in the tube section's latch panels. When the mast is fully extended, latch pins from each collar assembly will be engaged into cutouts in the latch panel of the next smaller adjacent tube section. The internal pressure of the mast can then be reduced to atmospheric pressure as positive contact between the locking pins and tube section's latch panels will keep the mast extended.

Figure 1:
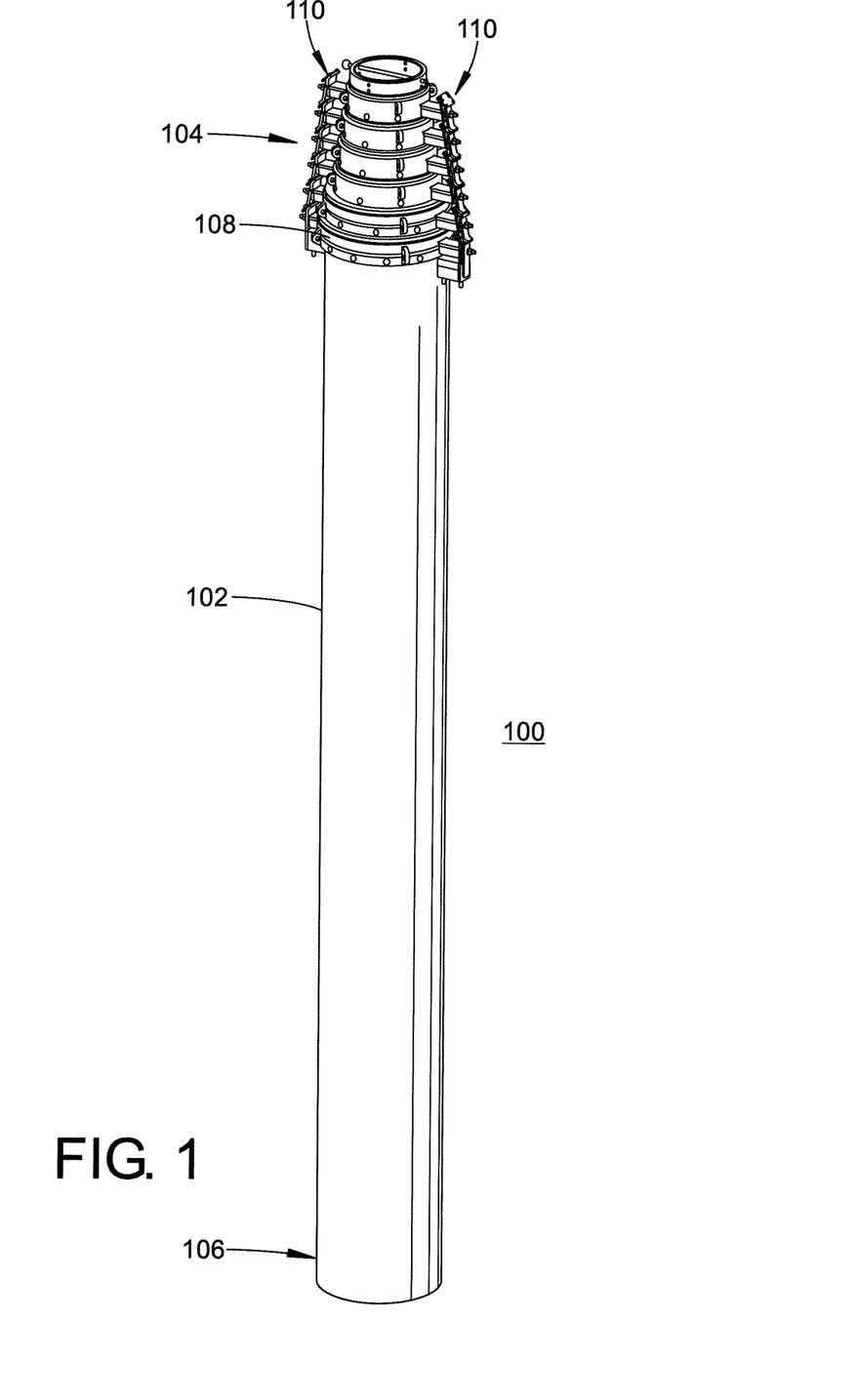
FIG. 1 is a perspective view of an exemplary mast assembly in accordance with the present disclosure.

To retract the mast, the internal pressure of the mast must be increased to remove the load from the pins due to tube and payload weight. Air cylinders mounted to the bottom of the base tube collar are then actuated. The air cylinder's pistons contact the latch levers on the base tube collar, which then actuates the locking pins, thereby removing them from the cutout in the latch panel of the next smaller adjacent tube section. The pressure in the mast is then reduced so that the unlocked tube section retracts. At the end of retraction, the latch levers on the collar of the unlocked section contacts the guide plate/bearings of the lower collar, thereby actuating the locking pins and removing them from the cutout in the latch panel of the next smaller adjacent tube section. The process is repeated until all locking pins are actuated and the mast is fully unlocked and retracted Referring now to the drawings, wherein the showings are for the purpose of illustrating exemplary embodiments of the disclosure only and are not for the purpose of limiting same, FIG. 1 illustrates an exemplary auto-locking mast assembly 100 in accordance with the present disclosure. The mast assembly 100 generally includes a base section or tube 102 having a top or upper portion 104 and a bottom or lower portion 106. A telescoping portion 108 is illustrated as being situated generally adjacent the top or upper portion 104 of the mast assembly 100. However, such an arrangement is only exemplary, and the particular location of the telescoping portion is non-limiting. For example, the telescoping portion 108 could alternatively be situated adjacent the lower portion 106. An auto-lock/unlock system 110 is also shown and is generally located on one or both sides of the telescoping portion 108 of the mast assembly 100.

Figure 2:
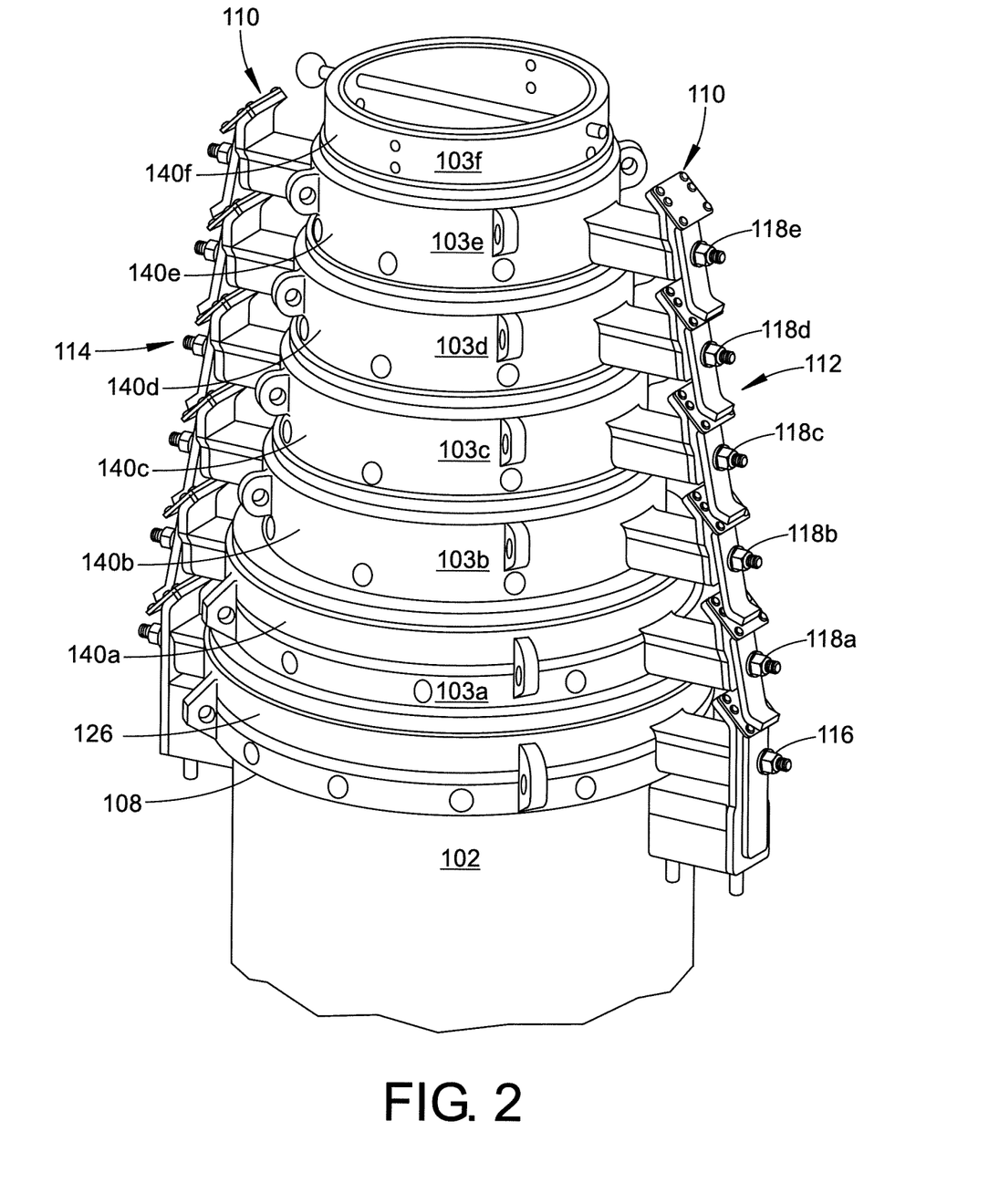
FIG. 2 is an enlarged perspective view of the exemplary mast assembly of FIG. 1 showing a telescoping portion in a nested position.
Figure 3:
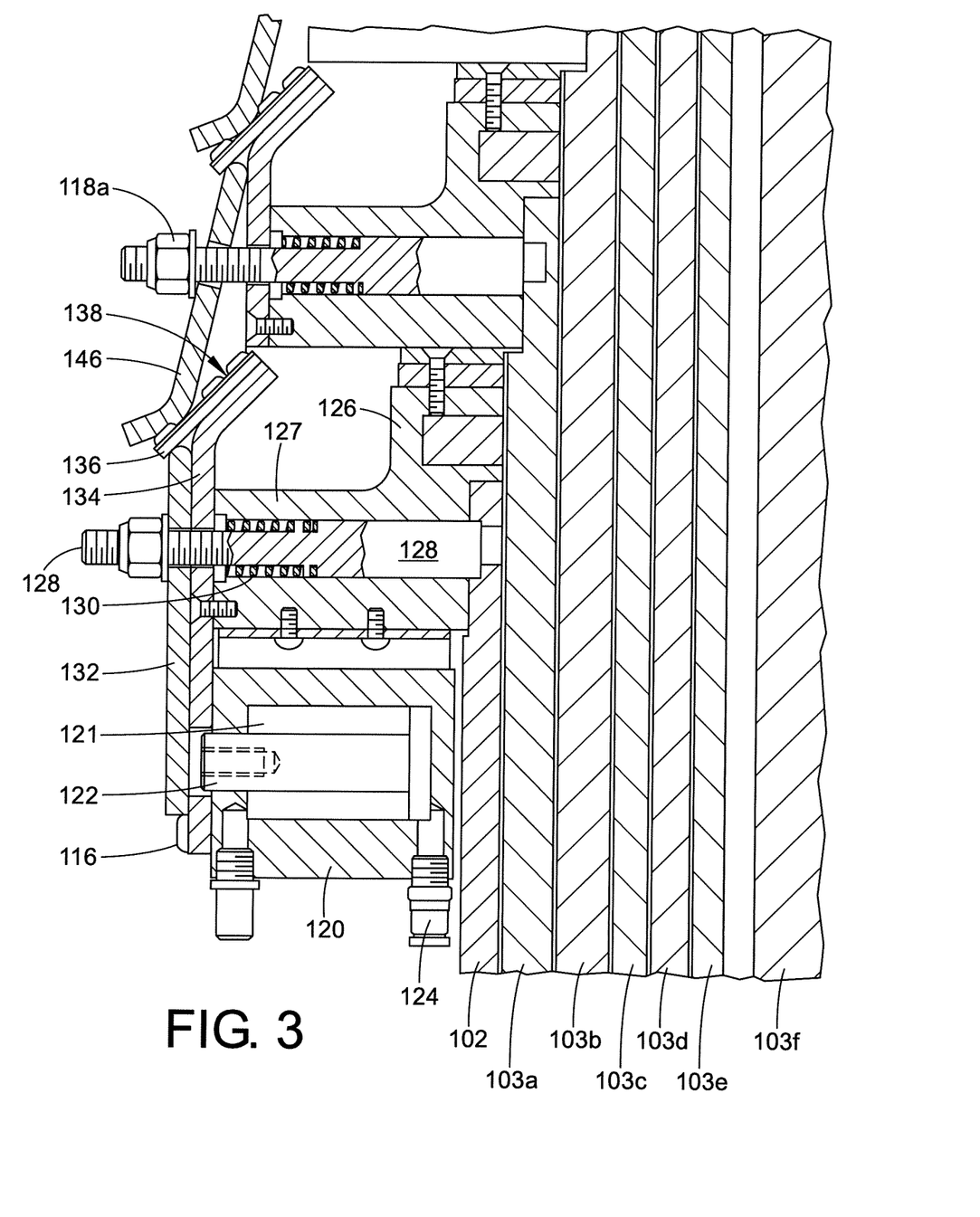
FIG. 3 is an enlarged cross-sectional side view of the exemplary mast assembly of FIG. 1 showing a base tube and a first intermediate tube in the nested position.

With further reference to FIGS. 2 and 3, the telescoping portion 108 of the mast assembly 100 in FIG. 1 is generally composed of a plurality of telescoping mast sections 103a-103f. As will be appreciated, each of the mast sections 103a, 103b, 103c, 103d, 103e, and 103f is typically telescopically received in the adjacent base section or tube 102. As the present disclosure relates to a pneumatically or hydraulically actuated mast, the telescoping mast sections can be sealed together such that pressurized air or fluid can be used to extend the telescoping mast sections 103a-103f out of each other and/or the base section 102.

With continued reference to FIG. 2, the auto-lock/unlock system 110 is illustrated as being located on both sides of the telescoping portion 108 of the mast assembly 100. That is, the auto-lock/unlock system 110 is shown as including a first stack of auto-locking assemblies 112 located on one side of the telescoping portion 108 and a second stack of auto-locking assemblies 114 located on an opposing side of the telescoping portion. However, such an arrangement is only exemplary and it should be understood that the auto-lock/unlock system 110 can include any desired number of stacks of auto-locking assemblies. For example, the auto-lock/unlock system 110 could include a single stack or two or more stacks of auto-locking assemblies without departing from the scope of the present disclosure. The particular number of desired stacks of auto-locking assemblies may depend on, for example, the size of the mast assembly or the weight of any payload that may be attached to the mast assembly, where larger sized masts and heavier payloads may require additional stacks of auto-locking assemblies compared with smaller sized masts and lighter payloads.

Figure 4:
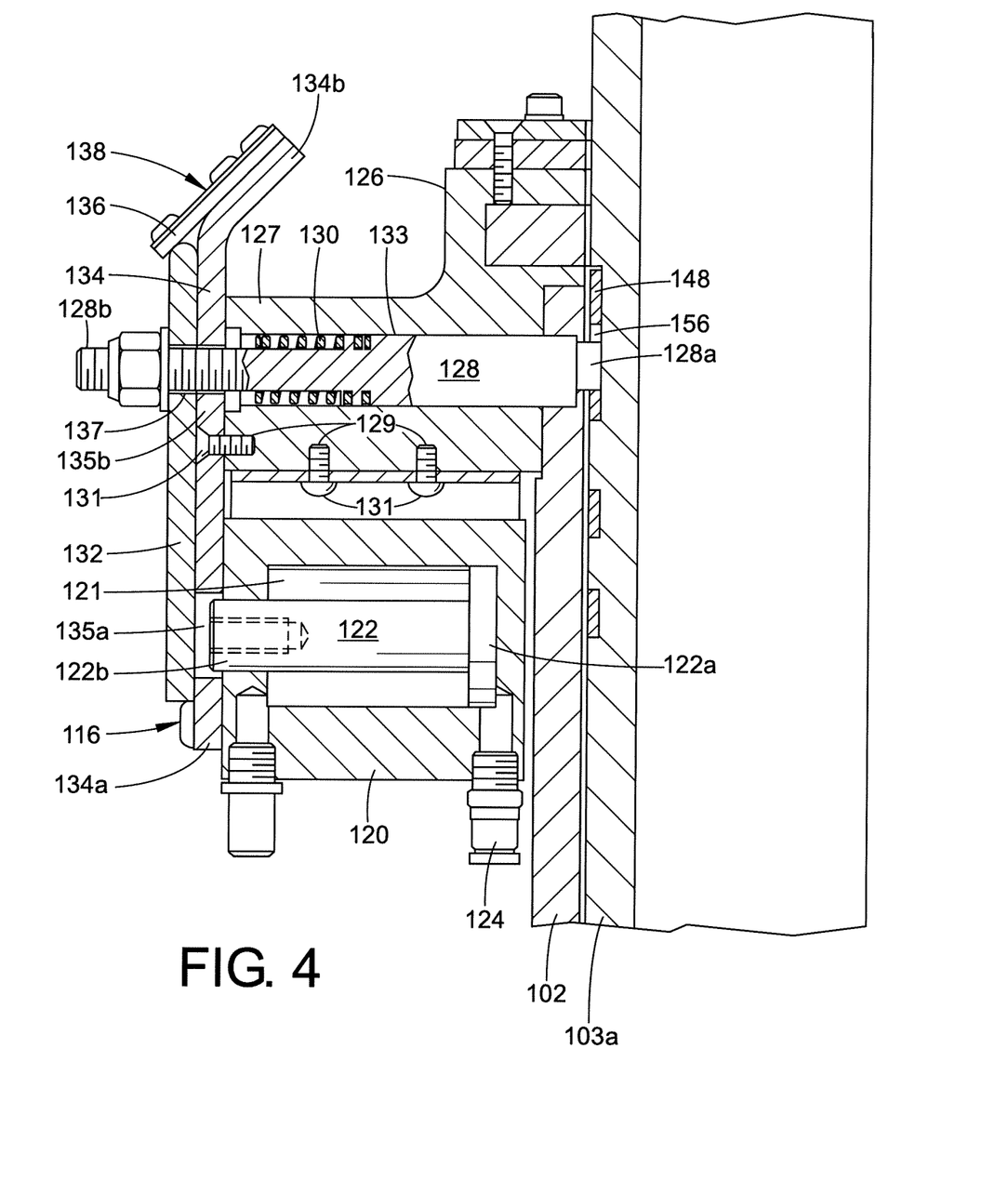
FIG. 4 is an enlarged cross-sectional side view of the exemplary mast assembly of FIG. 1 showing a base tube and corresponding auto-locking assembly when the mast assembly is in an extended and locked position; and, FIG. 5 is an enlarged cross-sectional side view of the exemplary mast assembly of FIG. 1 showing a first intermediate tube and corresponding auto-lock assembly when the mast assembly is in the extended and locked position.
Figure 5:
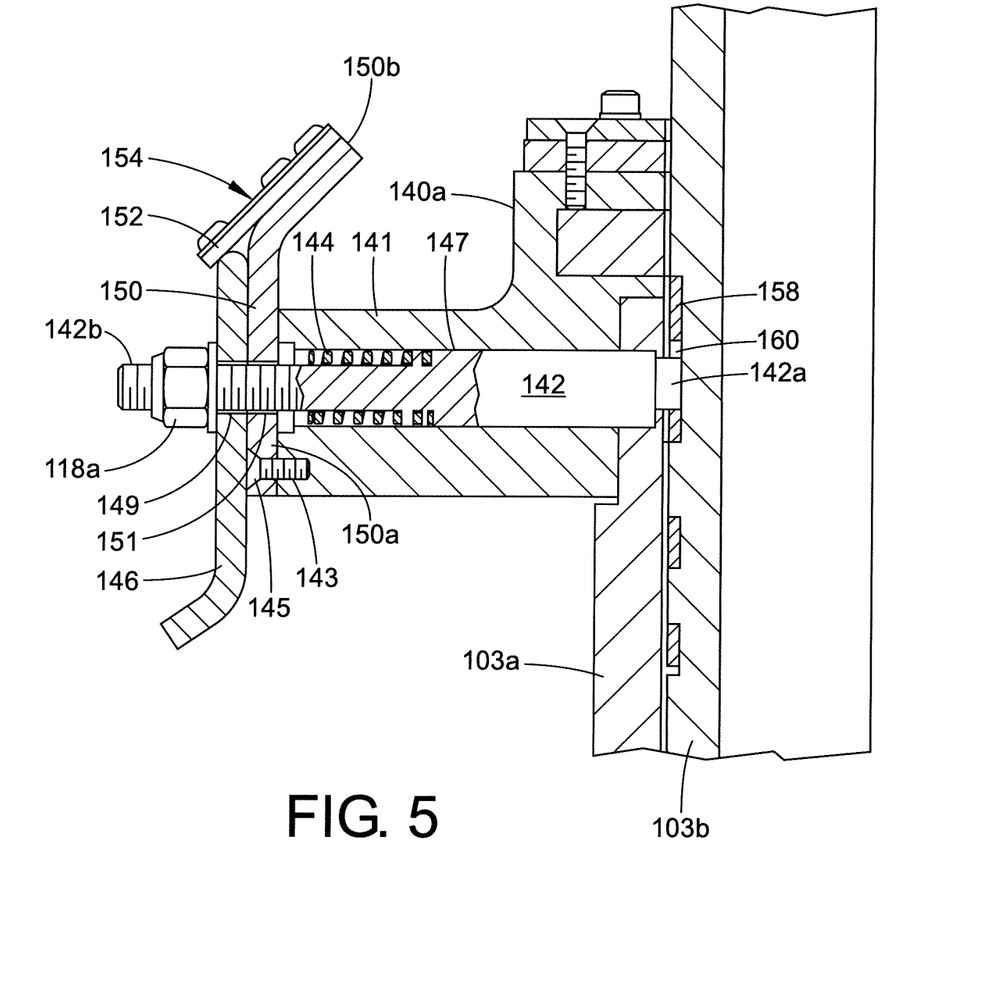

With continued reference to FIG. 2, and as shown in further detail in FIGS. 3-5, the stacks of auto-locking assemblies 112, 114 each generally include at least one base auto-lock 116 and n−1 intermediate auto-locks 118, where n is equal to the number of telescoping mast sections included in a given mast assembly. For example, the mast assembly 100 as illustrated in FIG. 2 includes six (6) telescoping mast sections 103a-103f (i.e., n=6). Thus, five (5) intermediate auto-locks 118a-118e (i.e., 6–1) are provided for telescoping mast sections 103a-103e. Mast section 103f, being the last section of telescoping portion 108, does not require an auto-lock because no additional mast section needs to be locked into place above the last section. While each intermediate auto-lock 118a-118e typically corresponds to a differently sized telescoping mast section 103a-103e, the features of the intermediate auto-locks are generally identical. Accordingly, only the first intermediate auto-lock 118a will be described in the additional detail illustrations of FIGS. 3 and 5 but it should be appreciated that each of the intermediate auto-locks generally includes the same features.

In any event, the first auto-lock in each stack of auto-locking assemblies that may be included in a given mast assembly of the present disclosure is typically a base auto-lock assembly, such as base auto-lock 116 illustrated in FIG. 2 and shown in greater detail in FIGS. 3 and 4. The base auto-lock assembly 116 is attached to the base section or tube 102 and generally includes an actuating cylinder body 120, a collar 126, a latch pin 128, a latch lever 132, a guide plate 134, and a guide bearing 136. An electrical actuator (not shown) could also be used in place of the actuating cylinder 120 without departing from the scope of the present disclosure. A horizontal bore 121 is centrally located in the cylinder body 120 and is sized to house and permit the back and forth movement of a piston 122. An inlet/outlet 124 is fluidically connected to the bore 121 to provide pressurized fluid to and from the bore. The pressurized fluid, when provided to or released from the bore 121, enables the back and forth movement of the piston 122 within the bore. The piston 122 is oriented generally perpendicular to the vertically oriented base tube 102 and generally parallel to the horizontally oriented bore 121. The force receiving end 122a of the piston 122 is positioned adjacent the base tube 102 and the actuating end 122b is generally disposed adjacent the latch lever 132 and guide plate 134.

The latch lever 132 and guide plate 134 are oriented generally perpendicular to the horizontally oriented piston 122 and generally parallel to the vertically oriented base tube 102. Moreover, the latch lever 132 and guide plate 134 are generally disposed adjacent to one another, with the guide plate 134 being located closer in distance to the base tube 102. In other words, the latch lever 132 is generally disposed on or adjacent to a surface of the guide plate 134 which faces away from the base tube 102. A thru-hole 135a in the guide plate 134 permits the actuating end 122b of the piston 122 to extend there-through and contact the latch lever 132. The guide plate 134 further includes a guide bearing 136 disposed on a top or upper portion 134b, the guide bearing being angled inward toward the base tube 102. The guide bearing 136 provides a bearing surface 138 adapted to interact with the latch lever 146 of the intermediate auto-lock assembly 118a (see FIG. 3).

The base collar 126 provides a means for attaching the base auto-lock assembly 116 to the base section or tube 102. In this regard, the base collar 126 is mounted to an upper end of the base tube 102 and has a diameter corresponding to the diameter of the base tube. In other words, the base collar 126 is generally an annular body adapted to be inserted into an open end of the cylindrical base tube 102 and/or adapted to fit around the diameter of the base tube adjacent an upper, open end thereof. As such, the base tube 102 and the base collar 126 can be equipped with fully tapped thru-holes (not shown) around their circumference, the thru-holes of both components being aligned to receive a fastening means (not shown) which secures the base collar to the base tube. In addition, or alternatively, the base collar 126 can be welded to the base tube 102. The base collar 126 can be made of any suitable material such as a metal or composite material. The base collar 126 can be made by any suitable manufacturing process or processes such as molding, casting, machining, etc.

As mentioned above, the base collar 126 provides a means for attaching the base auto-lock assembly 116 to the base tube 102. However, the base collar 126 also provides a means for attaching the various components of the base auto-lock assembly 116 to the base collar itself. Accordingly, a plurality of countersink bores 129 can be provided in the base collar 126 that are adapted to receive suitable fasteners, such as screws 131 (see FIG. 4). The countersink bores 129 are generally used for securing the actuating cylinder 120 and guide plate 134 of the auto-lock assembly 116 to the base collar 126. In order to provide adequate space for securing the actuating cylinder 120 and guide plate 134 of the base auto-lock assembly 116, the base collar 126 includes a horizontally oriented arm portion 127 to which these components can be attached. The arm portion 127 extends a distance away from and generally perpendicular to the vertically oriented base tube section 102 and can include the plurality of countersink bores 129.

The arm portion 127 of the base collar 126 is also configured to house and permit the back and forth movement of the latch pin 128. In this regard, the latch pin 128 is disposed in a centrally located thru-hole 133 of the arm portion 127 of the base collar 126. The latch pin 128 is oriented generally perpendicular to the vertically oriented base tube 102 and generally parallel to the horizontally oriented arm portion 127. A locking end 128a of the latch pin 128 is positioned adjacent the base tube 102 and the opposite end 128b is positioned adjacent the latch lever 132 and guide plate 134. End 128b also includes a mechanical force generator, such as spring 130, which enables the back and forth movement of the latch pin 128 within the thru-hole 133. Moreover, the latch lever 132 is mounted in front of the spring 130 on end 128b of the latch pin 128, such that the spring is positioned between a step or ledge portion formed in the latch pin 128 and the guide plate 134. The mounting arrangement of the latch lever 132 and latch pin 128 creates a pivot point about which the latch pin can rotate inward and outward relative to the base tube 102.

One or more latch panels 148 are provided in the smaller adjacent telescoping mast section (i.e., 103a) that each include a cutout 156. The cutout 156 of each latch panel 148 is configured to receive the locking end 128a of the latch pin 128. More particularly, the spring 130 causes the locking end 128a of the latch pin 128 to engage the cutout 156 on a respective latch panel 148, thereby locking the telescoping mast section 103a into an extended position with respect to base tube 102. This occurs during an extension process when the mast section 103a is telescoping vertically upward from the base tube 102. In addition, a second thru-hole 135b in the guide plate 134 and a thru-hole 137 in the latch lever 132 permits end 128b of the latch pin 128 to extend there-through. In other words, thru-holes 135b and 137 permit the latch pin 128 to engage and disengage from the cutout 156 of the latch panel 148. The latch pin 128 is generally disposed above the piston 122.

With further reference now to FIGS. 2, 3, and 5, the intermediate auto-lock assembly 118a is attached to corresponding telescoping mast section 103a and generally includes, an intermediate collar 140a, a latch pin 142, a latch lever 146, a guide plate 150, and a guide bearing 152. The latch lever 146 and guide plate 150 are oriented generally perpendicular to the horizontally oriented latch pin 142 and generally parallel to the vertically oriented telescoping mast section 103a. Moreover, the latch lever 146 and guide plate 150 are generally disposed adjacent to one another, with the guide plate being located closer in distance to the telescoping mast section 103a. In other words, the latch lever 146 is generally disposed on or adjacent to a surface of the guide plate 150 which faces away from the telescoping mast section 103a. The guide bearing 152 is disposed on a top or upper portion 150b of the guide plate 150 and is angled inward toward the base tube 102. The guide bearing 152 provides a bearing surface 154 adapted to interact with the latch lever of subsequent intermediate auto-lock assembly 118b (see FIG. 2).

The intermediate collar 140a provides a means for attaching the intermediate auto-lock assembly 118a to the base section or tube 102. In this regard, the intermediate collar 140a is mounted to an upper end of telescoping mast section 103a and has a diameter corresponding to the diameter of the telescoping mast section. In other words, the intermediate collar 140a is generally an annular body adapted to be inserted into an open end of the telescoping mast section 103a and/or adapted to fit around the diameter of the mast section adjacent an upper, open end thereof. As such, the telescoping mast section 103*a* and the base collar 140*a* can be equipped with fully tapped thru-holes (not shown) around their circumference, the thru-holes of both components being aligned to receive a fastening means (not shown) which secures the intermediate collar to the telescoping mast section. In addition, or alternatively, the intermediate collar 140*a* can be welded to telescoping mast section 103*a*. The intermediate collar 140*a* can be made of any suitable material such as a metal or composite material. The intermediate collar 140*a* can be made by any suitable manufacturing process or processes such as molding, casting, machining, etc.

As mentioned above, the intermediate collar 140*a* provides a means for attaching the intermediate auto-lock assembly 118*a* to the telescoping mast section 103*a*. However, the intermediate collar 140*a* also provides a means for attaching the various components of the intermediate auto-lock assembly 118*a* to the collar itself. Accordingly, one or more countersink bores 143 can be provided in the intermediate collar 140*a* that are adapted to receive suitable fasteners, such as screws 145 (see FIG. 5). The one or more countersink bores 143 are generally used for securing the guide plate 150 of the intermediate auto-lock assembly 118*a* to the intermediate collar 140*a*. In order to provide adequate space for securing the guide plate 150, the intermediate collar 140*a* includes a horizontally oriented arm portion 141 to which the guide plate can be attached. The arm portion 141 extends a distance away from and generally perpendicular to the vertically oriented telescoping mast section 103*a* and can include the one or more countersink bores 143.

The arm portion 141 of the intermediate collar 140*a* is also configured to house and permit the back and forth movement of the latch pin 142. In this regard, the latch pin 142 is disposed in a centrally located thru-hole 147 of the arm portion 141 of the intermediate collar 140*a*. The latch pin 142 is oriented generally perpendicular to the vertically oriented telescoping mast section 103*a* and generally parallel to the horizontally oriented arm portion 141. A locking end 142*a* of the latch pin 142 is positioned adjacent the telescoping mast section 103*a* and the opposite end 142*b* is positioned adjacent the latch lever 146 and guide plate 150. End 142*b* also includes a mechanical force generator, such as spring 144, which enables the back and forth movement of the latch pin 142 within the thru-hole 147. Moreover, the latch lever 146 is mounted in front of the spring 144 on end 142*b* of the latch pin 142, such that the spring is positioned between the telescoping mast section 103*a* and the guide plate 150. The mounting arrangement of the latch 146 and latch pin 142 creates a pivot point about which the latch pin can rotate inward and outward relative to the telescoping mast section 103*a*.

One or more latch panels 158 are provided in the subsequent smaller adjacent telescoping mast section (i.e., 103*b*) that each include a cutout 160. The cutout 160 of each latch panel 158 is configured to receive the locking end 142*a* of the latch pin 142. More particularly, the spring 144 causes the locking end 142*a* of the latch pin 142 to engage the cutout 160 on a respective latch panel 158, thereby locking the telescoping mast section 103*b* into an extended position with respect to mast section 103*a*. This occurs during an extension process when the mast section 103*b* is telescoping vertically upward from the mast section 103*a*. In addition, a thru-hole 149 in the latch lever 146 and a thru-hole 151 in the guide plate 150 permit end 142*b* of the latch pin 142 to extend there-through. In other words, thru-holes 149 and 151 permit the latch pin 142 to engage and disengage from the cutout 160 of the latch panel 158.

In view of the various components of the exemplary mast assembly 100 discussed above, the operation of the mast assembly and the auto-locking/unlocking function of the auto-lock/unlock system 110 will now be discussed. While the operation of the presently disclosed mast assembly 100 will be primarily discussed with reference to the base tube 102, the first intermediate mast tube section 103*a*, and the second intermediate mast tube section 103*b* it should be understood that because the features of the remaining intermediate mast tube sections 103*c*-103*f* are generally identical, the other intermediate mast tube sections operate in substantially the same manner as the first and second intermediate mast tube sections.

With reference to FIG. 3, the base tube 102 and intermediate telescoping mast section 103*a* of the mast assembly 100 are illustrated in a nested position. The nested position of the base tube 102 and all telescoping mast sections 103*a*-103*f* is also illustrated FIG. 2. When it is desired to extend the first intermediate telescoping mast section 103*a*, the internal pressure of the entire mast (i.e., base tube 102 and intermediate sections 103*a*-103*f*) is increased relative to the outside atmospheric pressure, causing the first intermediate mast section to extend away from the stationary base tube. As illustrated in FIG. 4, the first intermediate tube section 103*a* reaches its maximum extended height when the latch panel 148 disposed around the outside surface of the first intermediate tube section contacts the base collar 126 the base tube 102. Once this happens, latch pin 128 (which is pre-loaded via spring 130) of the base collar 126, engages into the cutout 156 of the latch panel 148 on the first intermediate tube section 103*a*, thereby locking the telescoping mast section 103*a* into an extended position with respect to base tube 102.

As illustrated in FIG. 5, the second intermediate tube section 103*b* reaches its maximum extended height when the latch panel 158 disposed around the outside surface of the second intermediate tube section contacts the intermediate collar 140*a* of the first intermediate mast section 103*a*. Once this happens, latch pin 142 (which is pre-loaded via spring 144) of the intermediate collar 140*a*, engages into the cutout 160 of the latch panel 158 on the second intermediate tube section 103*b*, thereby locking the second intermediate tube section into an extended position with respect to first mast section 103*a*. When the mast assembly 100 is fully extended, the latch pins from each intermediate collar assembly (140*a*-140*f*) will be engaged into the cutouts of the latch panel of the next smaller adjacent tube section. The internal pressure of the mast assembly 100 can then be reduced to atmospheric pressure as positive contact between the latch pins and tube section's latch panels will keep the mast extended.

When it is desired to retract the first intermediate telescoping mast section 103*a*, the internal pressure of the entire mast (i.e., base tube 102 and intermediate sections 103*a*-103*f*) is increased to remove the load from the latch pins due to tube and payload weight. The air cylinder 120 mounted to the base collar 126 are then actuated. More particularly, when the piston 122 of the air cylinder 120 contacts the latch lever 132 on the base collar 126, the pivot point created by the mounting arrangement between the latch lever and the latch pin 128 permits the latch lever to rotate outward relative to the first intermediate tube section 103*a*. This rotational motion of the latch lever 132 pulls the latch pin 128 linearly away from the first intermediate tube section 103*c*, overcomes the force exerted by spring 130, and causes the latch pin to disengage the cutout 156 of the latch panel 148 on the first intermediate tube section. The pressure in the mast assembly 100 is then reduced so that first intermediate tube section 103a, now unlocked from base tube 102, begins to retract.

At the end of retraction (see FIG. 3), the latch lever 146 on the intermediate collar 140a of the unlocked first intermediate tube section 103a contacts the guide plate 134 and guide bearing 136 of the base collar 126. The contact between the latch lever 146 and the guide bearing 136 of the guide plate 134 actuates the latch pin 142. More particularly, when the latch lever 146 contacts the guide bearing 136 of the guide plate 134, the pivot point created by the mounting arrangement between the latch lever and the latch pin 142 permits the latch lever to rotate. Due to the guide plate 134 being oriented at an angle, contact between the latch lever 142 and guide bearing 136 causes the latch lever to rotate outward relative to the second intermediate tube section 103b. This rotational motion of the latch lever 142 pulls the latch pin 142 linearly away from the second intermediate tube section 103b, overcomes the force exerted by spring 144, and causes the latch pin to disengage from the cutout 160 of the latch panel 158 on the second intermediate tube section. The second intermediate tube section 103b, now unlocked from the first intermediate tube section 103a, begins to retract.

At the end of retraction, the latch lever on the second intermediate collar 140b of the unlocked second intermediate tube section 103b contacts the guide plate 150 and guide bearing 152 of the first intermediate collar 140a. The contact between the latch lever and the guide bearing 152 of the guide plate 150 actuates the latch pin of the second intermediate collar 140b. More particularly, when the latch lever of the second intermediate collar 140b contacts the guide bearing 152 of the guide plate 150, the pivot point created by the mounting arrangement between the latch lever and the latch pin permits the latch lever to rotate. Due to the guide plate 150 being oriented at an angle, contact between the latch lever and guide bearing 152 causes the latch lever to rotate outward relative to the third intermediate tube section 103c. This rotational motion of the latch lever pulls the latch pin linearly away from the third intermediate tube section 103c, overcomes the force exerted by the associated spring, and causes the associated latch pin to disengage the respective latch penal cutout on the third intermediate tube section. The third intermediate tube section 103c, now unlocked from the second intermediate tube section 103b, begins to retract. As retraction continues, the locking pins of each intermediate collar are disengaged from the latch panel cutouts of the next smaller adjacent intermediate tube section. This is repeated until all locking pins are actuated and the mast assembly 100 is fully unlocked and retracted.

The exemplary auto-locking mast assembly described in the present disclosure provides many advantages over telescoping mast assemblies currently known in the art. For example, the mast unlocking method described herein, and more particularly, the initial step of unlocking the mast, can be easily remotely controlled. That is, a user is not required to contact/touch the mast in order to lock/unlock the mast. As another example, the positive contact between adjacent collar components is automatically unlocked between intermediate and top mast sections during retraction, thereby decreasing the overall time it takes to retract the mast assembly. As yet another example, the pre-loaded latch pins described herein automatically lock into place at the end of mast section travel, thereby decreasing the overall time it takes to fully extend the mast assembly. As another example, the locking pins described herein are a simple latch pin design which provide for optimal manufacturability and reduced cost thereof. Moreover, the automated locking and unlocking of the exemplary mast assembly described herein reduces or even eliminates water and dust ingress pathways.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An auto-lock assembly for a telescoping mast having a plurality of telescoping tube sections configurable between a retracted position and an extended position, the assembly comprising:
   a first latch pin mounted perpendicularly to a first tube section, the first latch pin being pre-loaded toward a locked position with a second tube section and configured to move linearly to an unlocked position with respect to the second tube section;
   a first latch lever mounted to the first latch pin, the first latch lever configured to pivot between a parallel position and a rotated position with respect to the first tube section;
   a guide plate mounted to a third tube section and an angled bearing surface disposed on an upper portion of the guide plate, the guide plate and angled bearing surface configured to contact the first latch lever;
   wherein the first latch pin is pre-loaded via a spring to move linearly into the locked position with the second tube section when the second tube section is in the extended position with respect to the first tube section and the first latch pin automatically locks due to a spring bias force,
   wherein the first latch pin moves linearly from the locked position to the unlocked position by the pivoting movement of the first latch lever and the first latch lever pivots from the parallel position to the rotated position by the contact with the angled bearing surface of the guide plate when the first tube section is in the retracted position with respect to the third tube section to thereby allow the retracted position of the second tube section with respect to the first tube section and wherein moving the first latch pin from the locked position to the unlocked position starts a cascade event whereby all of the telescoping tube sections are unlocked.

2. The auto-lock assembly of claim 1, wherein the third tube section is a base tube, the first tube section is a plurality of intermediate tubes, and the second tube section is an end tube.

3. The auto-lock assembly of claim 1, further comprising a first latch panel disposed on the second tube section and configured to receive the first latch pin when in the locked position.

4. The auto-lock assembly of claim 1, further comprising a collar configured to mount the auto-lock assembly to one of the telescoping tube sections in the plurality of telescoping tube sections.

5. The auto-lock assembly of claim 1, further comprising:
   a second latch pin mounted perpendicularly to the third tube section, the second latch pin being pre-loaded toward a locked position with the first tube section and configured to move linearly to an unlocked position with respect to the first tube section;

a second latch lever mounted to the second latch pin, the second latch lever configured to pivot between a parallel position and a rotated position with respect to the third tube section; and, a piston disposed below the second latch pin and mounted perpendicularly to the third tube section, the piston configured to move linearly to actuate the second latch lever.

6. The auto-lock assembly of claim 5, wherein the second latch pin moves linearly from the locked position to the unlocked position by the pivoting movement of the second latch lever and the second latch lever pivots from the parallel position to the rotated position by the linear movement of the piston to thereby allow the retracted position of the first tube section with respect to the third tube section.

7. The auto-lock assembly of claim 5, further comprising a second latch panel disposed on the first tube section and configured to receive the second latch pin when in the locked position.

8. The auto-lock assembly of claim 1, wherein the latch pin is spring-activated.

9. A telescoping mast comprising:
a plurality of telescoping mast sections including a base tube, an intermediate tube, and an end tube, the intermediate and end tube adapted to be telescopically received in the base tube;
a base auto-lock having a collar for mounting to the base tube and an intermediate auto-lock having a collar for mounting to the intermediate tube;
wherein both the base auto-lock and the intermediate auto-lock include:
a latch pin housed in the collar and configured to move linearly between a locked and unlocked position, wherein the latch pin is pre-loaded via a spring and automatically locks due to a spring force bias;
a latch lever mounted to the latch pin and configured to pivot between a parallel position and a rotated position with respect to the plurality of telescoping mast sections;
a base auto-lock guide plate mounted on the collar;
wherein the base auto-lock latch pin is movable into the locked position with the intermediate tube when the intermediate tube is extended out of the base tube;
wherein the intermediate auto-lock latch pin is movable into the locked position with the end tube when the end tube is extended out of the intermediate tube and is movable into the unlocked position with the end tube when the intermediate auto-lock latch lever pivots from the parallel position to the rotated position by contact with the base auto-lock guide plate when the intermediate tube is retracted into the base tube, thereby allowing the end tube to retract into the intermediate tube and wherein moving the intermediate auto-lock latch pin from the locked position to the unlocked position starts a cascade event whereby all of the telescoping mast sections are unlocked.

10. The telescoping mast of claim 9, further comprising:
a piston housed in the base auto-lock collar below the latch pin and configured to move linearly to actuate the base auto-lock latch lever,
wherein the base auto-lock latch pin is movable into the unlocked position with the intermediate tube when the base auto-lock latch lever pivots from the parallel position to the rotated position by the linear movement of the piston, thereby allowing the intermediate tube to retract into the base tube.

11. The telescoping mast of claim 9, further comprising a latch panel disposed on the intermediate tube and configured to receive the base auto-lock latch pin when in the locked position.

12. The telescoping mast of claim 9, further comprising a latch panel disposed on the end tube and configured to receive the intermediate auto-lock latch pin when in the locked position.

13. The telescoping mast of claim 9, wherein the latch pin of both the base and intermediate auto-locks is spring-activated.

14. The telescoping mast of claim 9, wherein the base auto-lock comprises a first base-auto lock disposed on one side of the collar and a second base auto-lock disposed on an opposite side of the collar.

15. The telescoping mast of claim 9, wherein the intermediate auto-lock comprises a first intermediate auto-lock disposed on one side of the collar and a second intermediate auto-lock disposed on an opposite side of the collar.

16. The telescoping mast of claim 9, wherein the intermediate tube comprises a plurality of intermediate tubes and the intermediate auto-lock comprises a plurality of intermediate auto-locks each having a collar for mounting to one intermediate tube in the plurality of the intermediate tubes.

17. The telescoping mast of claim 16, wherein each intermediate auto-lock in the plurality of intermediate auto-locks comprises a first intermediate auto-lock disposed on one side of the collar and a second intermediate auto-lock disposed on an opposite side of the collar.

18. An auto-lock for use with a telescoping mast having a plurality of tube sections, the auto-lock comprising:
a plurality of collars, each collar mountable to an associated tube section,
a plurality of spring-activated latch pins, each latch pin housed in an associated collar and oriented perpendicular to the plurality of tube sections, and configured to move linearly between a locked and an unlocked position with an associated tube section;
a plurality of latch levers, each lever mounted on an associated latch pin and configured to pivot between a parallel position and a rotated position with respect to the plurality of tube sections and to move the associated latch pin into the unlocked position; and,
a plurality of guide plates, each guide plate mounted on an associated collar, each guide plate configured to maintain an associated latch lever in the parallel and rotated position.

19. The auto-lock of claim 18, further comprising at least one piston housed in an associated collar and oriented perpendicular to the plurality of tube sections, the at least one piston configured to move linearly to actuate an associated latch lever and move the associated latch lever from the parallel position to the rotated position.

20. The auto-lock of claim 19, further comprising a plurality of latch panels, each latch panel disposed on an associated tube section and configured to receive an associated latch pin when in the locked position.

* * * * *